United States Patent [19]

Harris et al.

[11] 4,414,630

[45] Nov. 8, 1983

[54] ANTI-SKID VEHICLE BRAKING SYSTEMS

[75] Inventors: Alan L. Harris, Coventry; Alfred K. White, Birmingham, both of England

[73] Assignee: Lucas Industries Limited, Birmingham, England

[21] Appl. No.: 234,956

[22] Filed: Feb. 17, 1981

[30] Foreign Application Priority Data

Mar. 19, 1980 [GB] United Kingdom ............... 8009186

[51] Int. Cl.³ ............................................. G06F 15/20
[52] U.S. Cl. .................................... 364/426; 303/104; 303/97; 303/95
[58] Field of Search ................... 364/426; 303/95–97, 303/106, 107–109, 104

[56] References Cited

U.S. PATENT DOCUMENTS 3,718,374  2/1973  Ochia .............................. 303/109 X
3,889,128  6/1975  Luhdorff ......................... 303/97 X Primary Examiner—J. V. Truhe
Assistant Examiner—Saul M. Bergmann
Attorney, Agent, or Firm—Scrivener, Clarke, Scrivener and Johnson

[57] ABSTRACT

In an anti-skid vehicle braking system an electronic control unit is arranged to control the operation of an anti-skid valve assembly for modulating the fluid pressure applied to a brake actuator. A wheel speed sensor measures the speed of a braked wheel and produces a signal which is converted into a deceleration signal by a conditioning circuit and a differentiator and compared in a comparator with a deceleration threshold value. A pressure sensor provides a pressure signal corresponding to the current brake actuator pressure and a pressure signal conditioning circuit modifies the pressure signal to take account of a load signal produced by a load sensor which measures the loading of the braked wheel. The deceleration threshold value is produced by modulation of a constant threshold value in a threshold generator circuit and a threshold modulator circuit in response to the modified pressure signal. The threshold value is varied in response to the current pressure signal in accordance with a predetermined relationship between the threshold value and the brake actuator pressure, with a higher threshold value being provided for a higher actuator pressure. When the system is applied to the brakes of a low inertia axle, an over-ride circuit is included to provide a signal which over-rides the pressure signal for an initial period when the brake is applied as detected by a brake lamp switch.

7 Claims, 5 Drawing Figures

ANTI-SKID VEHICLE BRAKING SYSTEMS

SPECIFIC DESCRIPTION

This invention relates to an anti-skid vehicle braking system of the kind comprising a modulator assembly for modulating the fluid pressure applied to a brake actuator, a deceleration sensor for measuring the deceleration of a braked wheel, and an electronic control unit arranged to control the operation of the modulator assembly in response to signals produced by the deceleration sensor.

The smoothness and efficiency with which such systems operate depends upon the speed with which an imminent skid condition can be reliably detected.

In such systems it is well known for the electronic control unit to compare the deceleration signal produced by the deceleration sensor with a predetermined threshold value and to operate a modulator valve of the modulator assembly to reduce brake pressure when the deceleration signal exceeds the threshold value. However, since the deceleration value indicative of a skid condition varies widely for different road/wheel friction values ($\mu$) it is necessary to choose a threshold value which is high enough to permit normal braking on high-$\mu$ surfaces without the brakes being released unnecessarily. This means that on a low-$\mu$ surface a skid condition is not detected at the earliest possible time but only after the wheel speed has dropped relative to the vehicle speed by a substantial amount, with the result that the wheel speed recovery time is lengthened unnecessarily, and the vehicle stability is reduced due to a reduction in the resistance of the wheel to lateral slipping. If the chosen threshold value is too low, a skid signal may be issued as a result of the wheel running over bumps in the road, or of tire and suspension member deflections which occur as they accommodate changes in braking torque.

It has been proposed to provide a system with two discrete threshold values and to switch to the lower value after the higher threshold value has been exceeded. This helps to overcome the above problem, but is not sufficiently flexible to cope with constantly changing road surface conditions ($\mu$ values).

A system has also been proposed in which deceleration threshold is continuously varied in response to a signal corresponding to the rate of change of brake actuator pressure.

However, none of these previously proposed systems is capable of dealing with the condition known as 'sneak down' which tends to occur during gentle braking on low-$\mu$ surfaces with relatively high inertia axles such as commercial vehicle drive axles, especially when the inertia of the axle is increased by the fitting of a retarder device. Sneak down consists of the gradual deceleration of a braked wheel towards a locked condition, the deceleration taking place at a rate which is below the predetermined deceleration threshold value. Often axles are provided with comparators which compare the speeds of the wheels on the same axle in order to detect sneak-down of one wheel, but when the wheels decelerate together at the same rate this condition is not detected.

According to the invention a braking system of the kind set forth incorporates a pressure sensor to provide a signal corresponding to the current brake actuator pressure, and a deceleration signal produced by the deceleration sensor is compared with a deceleration threshold value in the control unit, the deceleration threshold value being variable in response to the current pressure signal in accordance with a predetermined relationship between the threshold value and the pressure, the predetermined relationship providing a higher threshold value for a higher brake actuator pressure.

For any given vehicle a known vehicle deceleration will result from the application of a given brake actuating pressure. During normal braking the rotational deceleration of the wheel should substantially match the linear deceleration of the vehicle. Thus, by choosing said predetermined relationship such that, over the full range of brake pressures, the deceleration threshold value corresponding to a given brake pressure is only slightly above the value of vehicle deceleration that would be expected during normal braking at that brake pressure, an imminent skid condition can be detected very quickly for any value of $\mu$.

For example, consider a vehicle for which the control unit is set to expect a wheel deceleration of 0.4 g when the braking pressure is 300 p.s.i. If the vehicle brakes were applied at that pressure the control unit would adjust the deceleration threshold to a value of perhaps 0.7 g. Thus whilst the vehicle is running on a good surface with a $\mu$ value of at least 0.4, a skid should not be signalled. If however the vehicle runs onto a surface with a $\mu$ less than 0.4, the wheel deceleration will increase as a skid starts to develop. Detection will occur when the wheel deceleration exceeds 0.7 g. This is a substantial improvement over existing systems which would not detect the skid until considerably later when the wheel achieved the threshold deceleration (typically between 1.2 g and 1.8 g depending upon the type of vehicle). For vehicles having a wide variation between laden and unladen weights means may be provided to vary said predetermined relationship in response to a signal indicative of the loading of the vehicle, in order to compensate for the fact that the brake pressure/vehicle deceleration relationship will vary in dependence upon gross vehicle weight. The predetermined relationship is varied so that the deceleration threshold value associated with any pressure value is reduced for an increase in gross vehicle weight.

Preferably the predetermined relationship is modified in response to load by modifying the signal indicative of wheel brake pressure.

The present invention is particularly applicable to a multi-axle vehicle in which each axle is provided with a separate anti-skid control unit for controlling the brakes on the respective axle. When a combined control unit is used it is known to detect sneak down by comparing the speeds of wheels on different axles, but when each axle is provided for convenience with a self-contained skid control system, for standardisation purposes and to avoid electric connections between axles, this is not feasible.

A problem which can arise with relatively low inertia axles is that relatively high decelerations can be exhibited by the wheels during optimum non-skid braking as the wheels are initially slowed down from vehicle synchronous speed to a lower speed at which optimum slip occurs.

When the system in accordance with the invention is applied to the brakes of a relatively low inertia axle the deceleration threshold is preferably arranged to adopt a relatively high initial value which is reduced after a predetermined delay to a value in accordance with the predetermined relationship.

Preferably the relatively high initial threshold value is produced by over-riding the pressure signal for a predetermined period, after which the over-riding action is terminated.

The invention will now be further described, by way of example only, with reference to the accompanying drawings in which.

Figure 1:
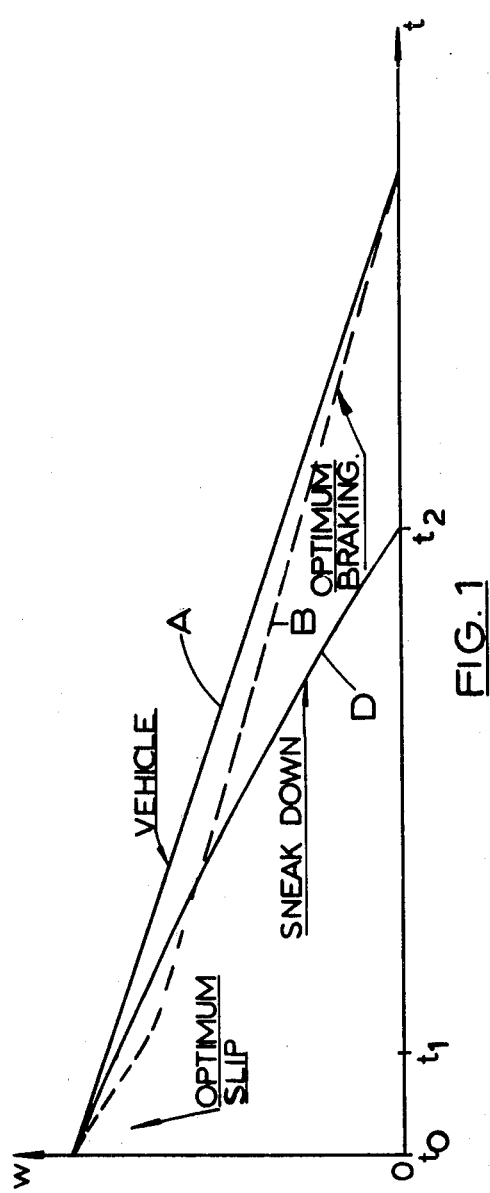
FIG. 1 is various curves of wheel and vehicle speed against time demonstrate the phenomenon of sneak down and indicate the optimum braking condition.

In FIG. 1 curves A and B are vehicle speed and wheel speed respectively against time for a vehicle that is braked to a stop in the optimum braking condition. At time $t_o$ when the brakes are first applied the vehicle speed and wheel speed are the same, but the wheel is then slowed down at faster rate than the vehicle to bring the wheel to the optimum slip condition. Curve C of FIG. 2 is the negative differential of curve B and demonstrates that the spin-down of the wheel to the optimum slip condition produces an initial peak in the deceleration curve having a crest at time $t_1$, but then the wheel deceleration settles down to a constant value.

Figure 2:
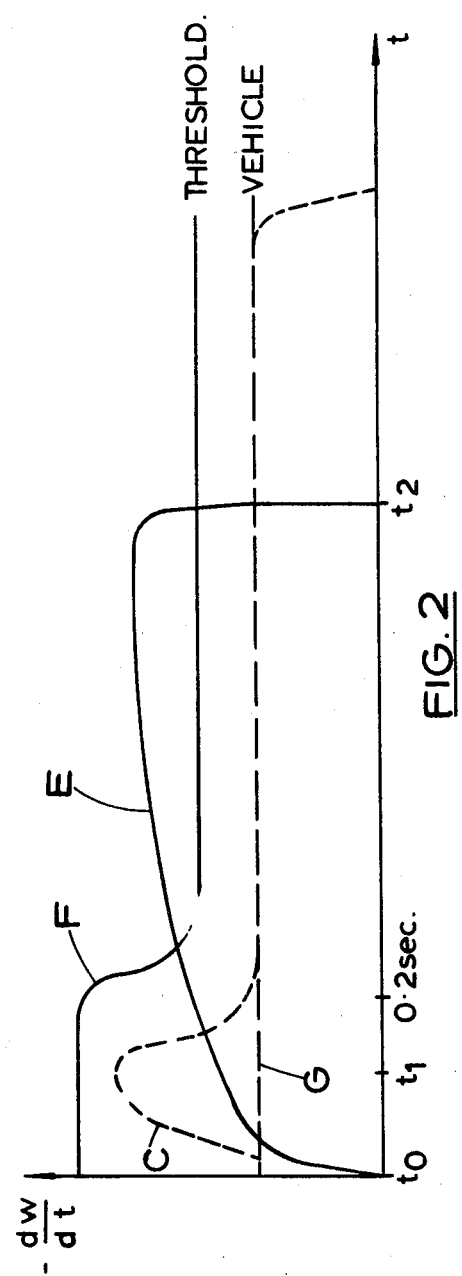
FIG. 2 shows two curves which are the negative differentials of the wheel speed curves of FIG. 1, together with a curve showing how the deceleration threshold of the circuit of FIG. 3 varies with time for a constant wheel brake pressure.

Curve D in FIG. 1 and curve E in FIG. 2 correspond to a sneak down condition in which the braked wheel decelerates at an increasing rate to a locked condition at time $t_2$. The vehicle speed curve for the sneak down condition has not been shown.

Figure 3:
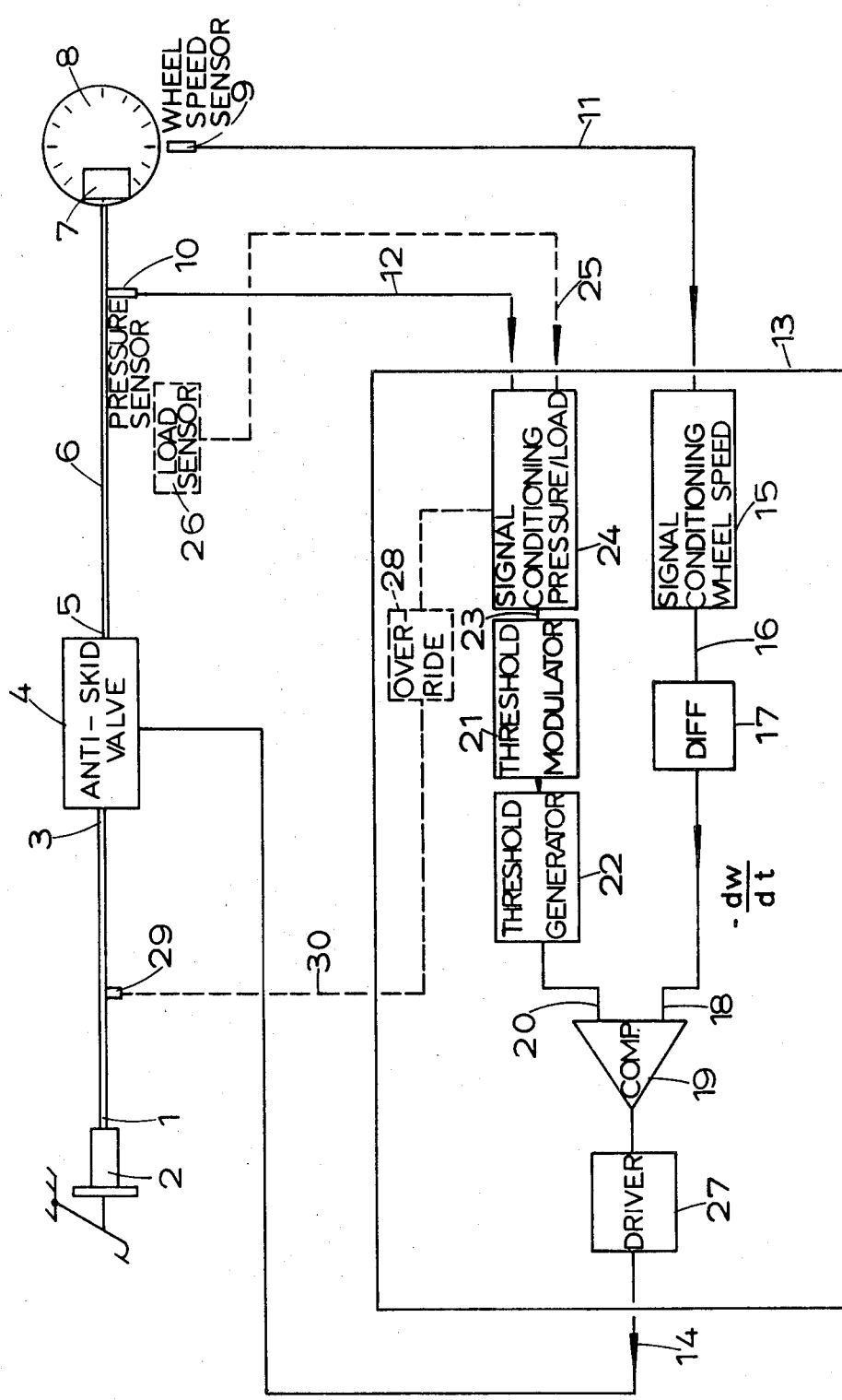
FIG. 3 is a block circuit diagram of an anti-skid braking system in accordance with the invention.

In the system of FIG. 3 the outlet 1 of the pedal-operated master cylinder 2 is connected to the inlet 3 of an anti-skid valve assembly 4 which has an outlet 5 connected by a fluid pressure line 6 to a wheel brake actuator 7 associated with a wheel 8. A wheel speed sensor 9 and a brake-line pressure sensor 10 provide signals on lines 11 and 12 respectively to an electronic control unit 13 which has an output 14 connected to the anti-skid valve 4 for controlling operation of the valve during an imminent skid situation.

The signal produced by wheel speed sensor 9 is a pulse train with a repetition frequency proportional to the speed of wheel 8, and this is converted in the usual way by a conditioning circuit unit 15 into a voltage on line 16 which corresponds to wheel speed and which is differentiated by a differentiator 17 to produce a wheel deceleration signal (dw/dt) at one input 18 of a comparator 19 which compares the current wheel deceleration signal with a deceleration threshold value applied to the other comparator input 20. The deceleration threshold value is produced by modulation in threshold generator circuit 22 of a constant threshold value in response to signals produced by a threshold modulator circuit 21. The modulation of the constant threshold value is carried out by circuits 21 and 22 in response to a modified pressure signal produced at the output 23 of a pressure signal conditioning circuit 24. Circuit 24 modifies the pressure signal received on line 12 to take account of a load signal produced on a line 25 by a load sensor 26 which measures the loading of the braked wheel 8. The load sensor 26 is located in any convenient position on the axle associated with wheel 8 and detects changes in the loading of the axle in response to varying loads carried by the vehicle. In a vehicle where the loading of the braked wheel is substantially constant the load sensor may be omitted. The modification performed by circuit 24 comprises reducing the pressure signal on line 23 as compared with that on line 12 in response to a signal on line 25 indicating an increased axle load, to compensate for the fact that a given brake line pressure will produce a reduced vehicle deceleration when the vehicle is more heavily loaded, and therefore a reduced deceleration threshold is appropriate. The reduced deceleration threshold results, as will be explained, from a reduced pressure signal.

Threshold modulator circuit 21 is arranged continuously to modulate the threshold value produced by circuit 22 in response to the modified pressure signal produced on line 23 so that the modified deceleration threshold value 20 corresponds to a deceleration which is slightly greater than the vehicle deceleration that would be produced by the vehicle brakes acting at that brake pressure if the vehicle were being braked in the optimum braking condition.

Figure 5:
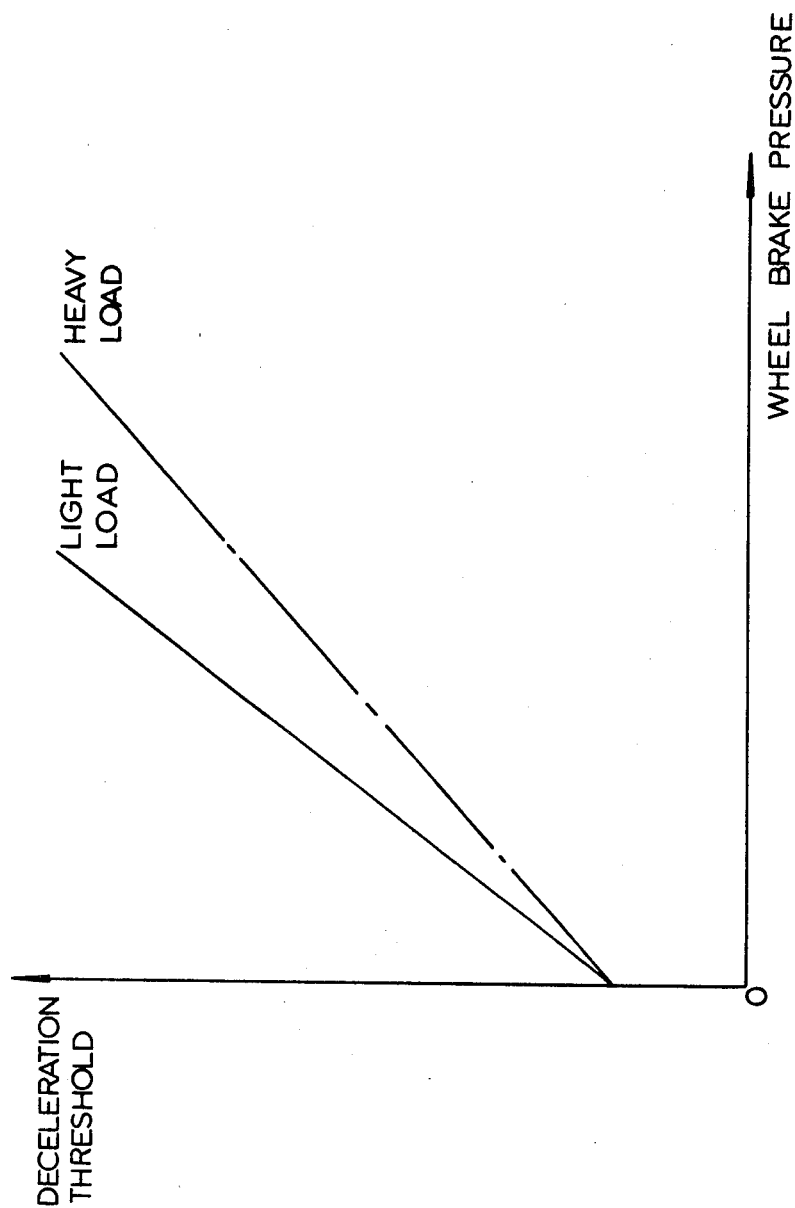
FIG. 5 is a graph relating to the circuit of FIG. 3.

FIG. 5 illustrates the manner in which the threshold is varied with wheel brake pressure and with vehicle load for the circuit of FIG. 3.

In the event that measured wheel deceleration on comparator input 18 is found by comparator 19 to exceed the current deceleration threshold value on comparator input 20 then a driver 27 is energised to energise anti-skid valve 4 and dump brake fluid from the line 6 to a reservoir, not shown, and thereby reduce the wheel brake pressure. If desired the valve 4 may be replaced by any convenient type of modulator assembly.

Since the modified threshold value is constantly changing in response to wheel brake pressure any departure of the wheel deceleration from the expected vehicle deceleration corresponding to the current wheel brake pressure is detected in a minimum time and corrective action is taken in a minimum time. The response of this circuit to a skid condition can therefore be made substantially faster than is usual.

The sensitivity of the circuit to a departure of the wheel deceleration from the expected vehicle deceleration may be such that in the case of a low inertia, lightly loaded wheel the peak C in the wheel deceleration curve would trigger release of the brakes unneccesarily. This may be overcome in various ways. One way shown in FIG. 3 is to incorporate an over-ride unit 28. The over-ride unit 28 provides a signal which dominates the pressure signal for a period of typically 0.2 sec commencing with the application of the brake pedal as detected by a brake lamp switch 29 which produces a signal on line 30. The effect of this is shown in curve F of FIG. 2 which represents the deceleration threshold value applied to comparator input 20. For the time period $t_o$ to 0.2 sec the threshold value is determined by the over-ride unit 18 which produces an over-ride signal in response to application of the brake pedal, the over-ride signal controlling the output of the modulator circuit 21 and therefore the output of the generator 22. After 0.2 sec the over-ride signal decays rapidly so that the pressure signal is no longer over-ridden and thereafter controls the modulator circuit 21. The threshold value is thereby reduced, as shown, to a value which is slightly above the vehicle deceleration, line G, that would be expected for that brake line pressure in the optimum braking conditions.

Sneak down normally takes several seconds to occur, so that a transient delay of the order of 0.2 sec will not impair detection of sneak down.

Figure 4:
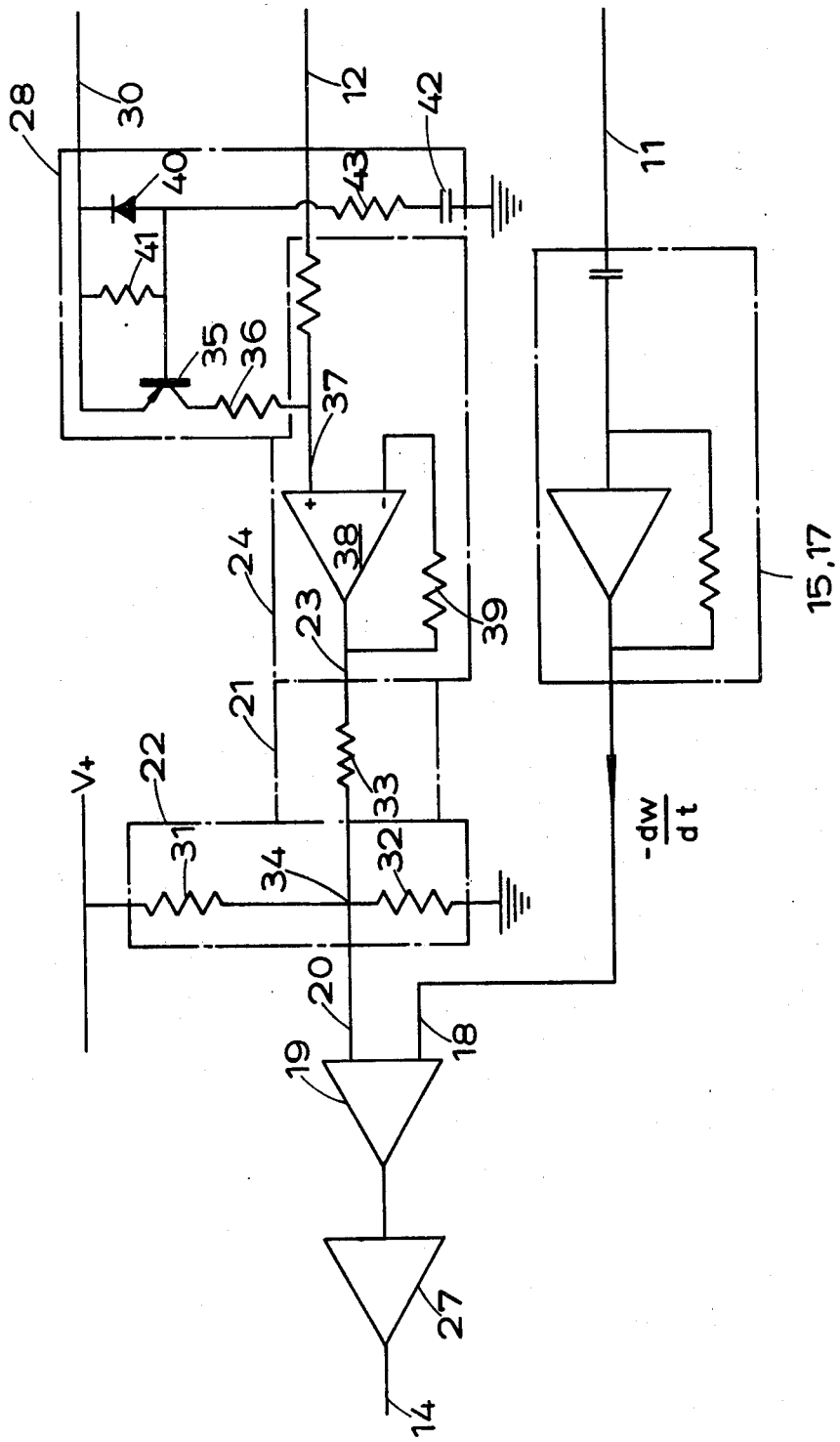
FIG. 4 is a more detailed circuit diagram of a control unit for use in the circuit of FIG. 3.

FIG. 4 is a more detailed circuit diagram showing the principal components of the control unit 13 of FIG. 3.

The threshold generator circuit 22 comprises a potential divider consisting of resistors 31 and 32 connected between the supply V+ and earth, and the threshold modulator circuit 21 comprises a resistor 33 connected between the output 23 of the conditioning circuit 24 and the junction 34 between resistors 31 and 32. The junction 34 is connected to the input 20 of comparator 19 and its potential determines the instantaneous threshold value of deceleration. It will be appreciated that changes in the potential of the output 23 of conditioning circuit 24 alter the potential of junction 34 and thereby alter the instantaneous threshold value.

The over-ride unit 28 comprises a transistor 35 of which the emitter is connected to the line 30 from brake lamp switch 29, and the collector is connected through a resistor 36 to the input 37 of an amplifier 38 provided with a negative feedback resistor 39. A diode 40 and resistor 41 are arranged in parallel between the base of transistor 35 and the line 30, and the base is connected to earth via a resistor 43 and capacitor 42.

Pressure sensor 10 is arranged to provide a potential on line 12 which increases with increasing pressure so that, in absence of action by the over-ride unit 28, the voltage of the output 23 of the conditioning circuit rises progressively with increasing wheel brake pressure, and consequently the voltage of junction 34, and the associated deceleration threshold value, rises progressively with wheel brake pressure in accordance with a linear relationship which is predetermined by the values of resistors 31, 32, 33, 34, 39 and the characteristics of amplifier 38. Brake lamp switch 29 comprises a normally open switch connected between line 30 and the V+ supply, so that on initial application of the brake pedal of master cylinder 2 the V+ supply is connected to the emitter of transistor 35 to turn on the transistor and provide a high positive voltage to the operative input 37 of amplifier 38, thereby to provide a high voltage on input 20 of comparator 19 and set a high initial threshold of wheel deceleration corresponding to the first part of curve F of FIG. 2. The necessary forward biassing of the emitter-base junction of transistor 35 during this initial period of brake application is provided by the voltage developed across resistor 41 by the charging current for the capacitor 42. However, after a time period of approximately 0.2 seconds, determined by the values of resistors 41 and 43 and of capacitor 42, the voltage across resistor 41 drops substantially to zero to cut-off the transistor 35 so that the voltage of amplifier input 37 is determined for the remainder of the braking period entirely by the signal from pressure sensor 10.

We claim:

1. An anti-skid vehicle braking system comprising a brake actuator associated with a vehicle wheel, a modulator assembly for modulating the fluid pressure applied to said brake actuator, a deceleration sensor for measuring the deceleration of said wheel, an electronic control unit for controlling the operation of said modulator assembly in response to signals produced by said deceleration sensor, and a pressure sensor for producing a signal corresponding to the current brake actuator pressure, said control unit incorporating at least part of said deceleration sensor, a threshold generator circuit for generating a deceleration threshold value, a comparator for comparing a wheel deceleration signal produced by said deceleration sensor with said deceleration threshold value and a threshold modulator circuit responsive to said current pressure signal, an input of said threshold generator circuit being connected to an output of said threshold modulator circuit, an output of said threshold generator circuit being connected to a threshold value input of said comparator for providing said comparator with a current threshold value, an input of said threshold modulator being connected to said pressure sensor, said threshold modulator producing at its output a modulation signal for controlling the threshold generator, and the threshold generator being arranged to vary said current threshold value in response to said modulation signal in accordance with a predetermined relationship between the threshold value and the brake actuator pressure, said predetermined relationship providing a higher threshold value for a higher brake actuator pressure.

2. An anti-skid vehicle braking system as claimed in claim 1 comprising a load sensing means for producing a load signal indicative of the loading of the vehicle, and means for modifying said predetermined relationship in response to said load signal.

3. An anti-skid vehicle braking system as claimed in claim 1 wherein said electronic control unit includes initial threshold means for setting an initial deceleration threshold value which is higher than the deceleration threshold computed in accordance with said predetermined relationship, and means for reducing the threshold value after a predetermined period from said initial value to a value in accordance with said predetermined relationship.

4. An anti-skid vehicle braking system as claimed in claim 1, comprising a pressure signal conditioning circuit of said electronic control unit, said pressure signal conditioning circuit being connected between said pressure sensor and said input to said threshold modulator to provide said threshold modulator circuit with a modified pressure signal.

5. An anti-skid vehicle braking system as claimed in claim 4, comprising a load sensor for producing a load signal indicative of the loading of the vehicle, and a control input of said pressure signal conditioning circuit connected to said load sensor, said conditioning circuit modifying said pressure signal in response to said load signal.

6. An anti-skid vehicle braking system as claimed in claim 4, comprising an over-ride unit of said electronic control unit for providing an over-ride pressure signal which over-rides said pressure signal from said pressure sensor for an initial predetermined period commencing with the application of the brake, said threshold modulator being responsive during said initial predetermined period to the modified over-ride pressure signal produced by said pressure signal conditioning circuit, whereby said threshold generator circuit produces an initial deceleration threshold value which is higher than a value computed in accordance with said predetermined relationship.

7. An anti-skid vehicle braking system comprising a brake actuator associated with a vehicle wheel, a modulator assembly for modulating the fluid pressure applied to said brake actuator, a deceleration sensor for measuring the deceleration of said wheel, an electronic control unit for controlling the operation of said modulator assembly in response to signals produced by said deceleration sensor, and a pressure sensor for producing a signal corresponding to the current brake actuator pressure, said control unit incorporating at least part of said deceleration sensor, comparator means for comparing a wheel deceleration signal produced by said deceleration sensor with a deceleration threshold value, threshold control means responsive to said current pressure signal for varying said threshold value in accordance with a predetermined relationship between the threshold value and the brake actuator pressure, said predetermined relationship providing a higher threshold value for a higher brake actuator pressure, initial threshold means for setting an initial deceleration threshold value which is higher than the deceleration threshold computed in accordance with said predetermined relationship, and means for reducing the threshold value after a predetermined period from said initial value to a value in accordance with said predetermined relationship.

* * * * *